US012689836B2

(12) United States Patent
Simons et al.

(10) Patent No.: US 12,689,836 B2
(45) Date of Patent: Jul. 21, 2026

(54) LIGHT-FIELD IMAGING BASED ON TILT-ABERRATION

(71) Applicant: Danmarks Tekniske Universitet, Kongens Lyngby (DK)

(72) Inventors: Hugh Simons, Kongens Lyngby (DK); Mario Alejandro Beltran, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 0 days.

(21) Appl. No.: 18/835,315

(22) PCT Filed: Feb. 24, 2023

(86) PCT No.: PCT/DK2023/050032
§ 371 (c)(1),
(2) Date: Aug. 1, 2024

(87) PCT Pub. No.: WO2023/165667
PCT Pub. Date: Sep. 7, 2023

(65) Prior Publication Data
US 2025/0142223 A1 May 1, 2025

(30) Foreign Application Priority Data

Mar. 1, 2022    (EP) ..................................... 22159440

(51) Int. Cl.
*H04N 23/951* (2023.01)
*G01J 9/00* (2006.01)
(Continued)

(52) U.S. Cl.
CPC .............. *H04N 23/951* (2023.01); *G01J 9/00* (2013.01); *G02B 21/0008* (2013.01);
(Continued)

(58) Field of Classification Search
CPC .. G01J 2009/002; G01J 9/00; G02B 21/0008; G02B 21/14; G02B 21/367;
(Continued)

(56) References Cited

U.S. PATENT DOCUMENTS 7,460,985 B2 * 12/2008 Benitez .............. G02B 27/0012
703/2
2005/0086032 A1 * 4/2005 Benitez .............. G02B 19/0004
703/1
2021/0311294 A1 10/2021 Hayashi

FOREIGN PATENT DOCUMENTS

EP        1505376 A1    2/2005

OTHER PUBLICATIONS

International Search Report and Written Opinion received for PCT Patent Application No. PCT/DK2023/050032, mailed on May 10, 2023, 8 pages.

* cited by examiner

*Primary Examiner* — Antoinette T Spinks
(74) *Attorney, Agent, or Firm* — BLANK ROME LLP

(57) ABSTRACT

A method, imaging system and computer program product for obtaining a transverse phase gradient of a wave field from at least a first and a second wavefield intensity map includes the steps of; capturing at a first incoherent tilt aberration the first wave field intensity map of a target at a first degree of incoherent tilt aberration, using a filter positioned between a source of electromagnetic radiation and an electromagnetic radiation detector capturing said first wave field intensity map; capturing at a second and different incoherent tilt aberration said second wave field intensity map of said target at a second degree of incoherent tilt aberration, using a filter positioned between a source of electromagnetic radiation and an electromagnetic radiation detector capturing the second wave field intensity map;

(Continued)

Figure 1:
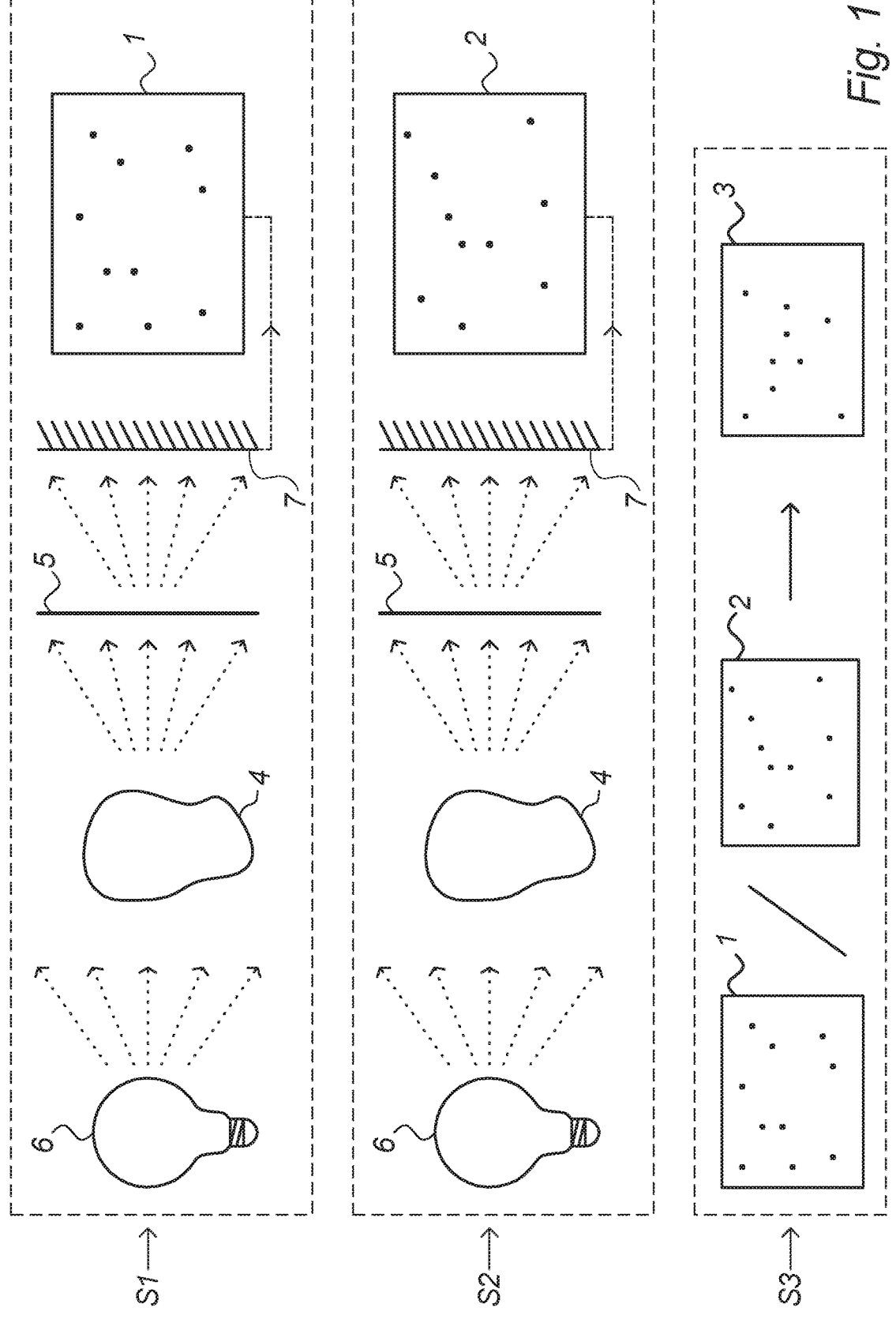

determining the transverse phase gradient on the basis of at least a difference of logarithms of wavefield intensity maps divided by the magnitude of the difference between the first incoherent tilt aberration and the second incoherent tilt aberration.

20 Claims, 8 Drawing Sheets

(51) Int. Cl.

| | |
|---|---|
| *G02B 21/00* | (2006.01) |
| *G02B 21/14* | (2006.01) |
| *G02B 21/36* | (2006.01) |
| *H04N 23/957* | (2023.01) |

(52) U.S. Cl.
CPC ........... *G02B 21/14* (2013.01); *G02B 21/367* (2013.01); *H04N 23/957* (2023.01); *G01J 2009/002* (2013.01)

(58) Field of Classification Search
CPC ......... G03H 1/0866; G03H 2001/0883; H04N 23/951; H04N 23/957
See application file for complete search history.

LIGHT-FIELD IMAGING BASED ON TILT-ABERRATION

CROSS-REFERENCE TO RELATED APPLICATIONS

This application is a National Phase entry of International Application Ser. No. PCT/DK2023/050032, filed on Feb. 24, 2023, which claims the benefit of priority of European Patent Application Ser. No. EP22159440.1 filed on Mar. 1, 2022. The entire content of these applications is hereby incorporated by reference.

FIELD OF THE INVENTION

The present invention relates to a method for obtaining a transverse phase gradient of a wavefield. The present invention further relates to an imaging system for carrying out the method, a computer program product, and a use of the method.

BACKGROUND OF THE INVENTION

Quantitatively reconstructing a complex optical wavefield allows prediction of its temporal evolution and energy flow. This ability has been transformative for imaging; enabling new experimental realizations (e.g., lensless imaging), enabling phase to be utilized as contrast due to targeted properties of the medium (e.g., thickness, refractive index, electromagnetic fields, crystallography, etc.), and enabling aberrations to be characterized and corrected (e.g., for adaptive optics, light-field imaging, digital refocusing, etc.).

Examples of such methods include Differential interference contrast, Classical ptychography, Fourier ptychography, TIE/defocus imaging, Holography, Micro lens arrays, Shack-Hartman sensors, Grating phase contrast, and Speckle-tracking.

These methods have led to major advances in biology, geology and materials research, which in turn drive the persistent need for new methods that are faster, more precise and more robust.

Specifically, there is a need for a way of retrieving a phase gradient of a light field which is versatile, robust as well as being simple, fast and inexpensive to implement.

SUMMARY OF THE INVENTION

An aspect of the present invention relates to a method for obtaining a transverse phase gradient of a wave field from at least a first wavefield intensity map and a second wave field intensity map, said method comprising the steps of:
  capturing at a first incoherent tilt aberration said first wave field intensity map of a target, using a first filter having an attenuation profile with a continuous derivative positioned between a source of electromagnetic radiation and an electromagnetic radiation detector capturing said first wave field intensity map,
  capturing at a second incoherent tilt aberration said second wave field intensity map of said target, using a second filter having an attenuation profile with a continuous derivative positioned between a source of electromagnetic radiation and an electromagnetic radiation detector capturing said second wave field intensity map, wherein said second incoherent tilt aberration is different from said first incoherent tilt aberration,
  determining said transverse phase gradient on the basis of at least a difference of logarithms of wavefield intensity maps divided by the magnitude of the difference between said first incoherent tilt aberration and said second incoherent tilt aberration.

Electromagnetic radiation, such as light, is associated with a complex wavefield $\Psi$ with real (amplitude) and imaginary (phase) components and may be represented by a function having the form $$\Psi(x, y) = A(x, y)e^{i\varphi(x, y)}$$

wherein A is the amplitude, $\varphi$ is the phase, and x and y are spatial coordinates in an associated plane which is transverse to a direction z of propagation of the wavefield. The z-axis may also be referred to as the optical axis. The optical axis defines a line along which there is some degree of rotational symmetry in an optical system, such as an optical imaging system including a camera system or microscope system. The optical axis is an imaginary line that defines the path along which radiation propagates through the system, up to first approximation.

Throughout the present disclosure, the electromagnetic radiation may be referred to as light, however, it should be appreciated that the discussion related to light may equally apply to other forms of electromagnetic radiation than light.

The phase of light contains valuable information about the light, such as information regarding the propagation of the light. One example is that the phase may be used to determine a direction of propagation of light. This is the case since measuring the direction of light is the same as measuring the gradient of the optical phase:

$$\theta_x = \frac{d\varphi}{dx}$$

$$\theta_y = \frac{d\varphi}{dy}$$

where $\theta_x$ and $\theta_y$ denotes angles in directions x and y that are perpendicular to the optical axis (z-axis).

The problem in measuring the intensity of light is that the phase information is lost in the intensity, as is clear from the following formula:

$$I(x, y) = |\Psi(x, y)|^2 = A(x, y)^2$$

This problem relating to loss of information concerning the phase, which typically occurs when a physical measurement is made, is commonly referred to as the "phase problem".

By the method of the present invention is provided an advantageous way of obtaining phase information from light intensity where the aforementioned phase problem is resolved. Thereby is provided a new and advantageous path to light-field imaging by the present invention. As an example, the method of the present invention is particular suitable for microscopy cells and other biological subjects which tend to be nearly transparent and thus difficult to image using conventional microscopes. Use of the present method may allow to retrieve structural information about the biological subject which could otherwise not be retrieved using conventional light microscopy techniques. The method of the present invention achieves this in a rather counterintuitive way by specifically exploiting a certain class of imperfections which are commonly present in imaging systems.

All physical imaging systems are by nature aberrated meaning that the (typically two-dimensional) intensity of the output field is different from that of the field input to the imaging system. Optical aberrations can be categorized into two types of aberrations: coherent aberrations and incoherent aberrations. Coherent aberrations affect only the phase of the wavefield and are therefore complex, i.e., of the form $e^{if(x,y)}$. Examples of coherent aberrations include defocus and spherical aberration. Incoherent aberrations, of which Gaussian blur and Airy disks are examples, affect only the amplitude of the wavefield and are therefore real, i.e., of the form $e^{f(x,y)}$. A particularly common aberration is incoherent tilt aberration, in which the aberration function, f(x,y), is of first order, e.g., $e^{\tau(x,y)}$. Note that, although referred to as incoherent tilt, this aberration does not require the physical tilting (changing of angle) of any of the physical components of the optical system.

Since optical aberrations are present in most imaging systems, these aberrations are also present in microscopy systems. The instinctive routine of most microscopist would be to undo the tilt-induced aberrations by either correcting using aberration balancing techniques or using digital wavefront corrections based on iterative-engine procedures. It is however contrary to the norm to exploit microscopic images that are contaminated with incoherent tilt aberration to perform deterministic phase retrieval without imposing any assumptions on the imaged target/object. Nonetheless, this is exactly what may be achieved by the method of the present invention.

The method according to the present invention is advantageous for a number of reasons.

First, the method is usable in a number of applications and devices including high-speed quantitative phase contrast imaging of cells and other biological subjects, ptychographic microscopy, computer imaging devices such as in cell phone camera (especially for refocusing of images), augmented-reality systems (especially for range finding), and virtual reality video capture systems (especially depth of field).

Second, the method is analytical and therefore does not necessarily rely on numerical solutions. This makes the method simple and fast, and thus usable in or for many applications.

Third, the method does not require prior assumptions regarding the target of interest/being studied. Thereby is provided a method which is potentially much faster and more robust than existing methods for e.g., light-field imaging.

Furthermore, the method is advantageous for the same reasons that other light-field imaging systems and methods are advantageous. For instance, with the present invention, it may be possible to re-focus an image after it has been obtained.

In the context of the present invention, a "wave field" may be understood as the space in which an electromagnetic wave propagates. By electromagnetic waves is understood waves including at least microwaves, infrared light, visible light, ultraviolet light, and X-rays.

In the context of the present invention, a "wave field intensity map" may be understood as a two-dimensional mapping of electromagnetic radiation intensity in an image plan intersecting the direction of propagation of the wavefield. In other words, the wave field intensity map may be regarded as an image depicting radiation intensity. For example, in the case of the electromagnetic radiation being light, the wave field intensity map may be an image depicting light intensity.

In the context of the present invention, a "target" is understood as any kind of physical object/subject which may be subject to incident electromagnetic radiation and scatter the electromagnetic radiation. For example, if the electromagnetic radiation comprises light, the target may be an object/subject which have to be studied using the light. Light incident on the target scatters from the target and may be recorded to provide an image of the target.

In the context of the present invention, "incoherent tilt aberration" is understood as any kind of deviation in the wave field induced by e.g., geometrical changes to components of an imaging system, such as displacements of the source of electromagnetic radiation, displacement of the target, and displacements of a filter. It must be readily appreciated that tilt does not necessarily require physical tilting (i.e., change of angle) of a physical component of an optical system, as the effect of incoherent tilt aberration may equally be obtained through other geometrical changes than tilting of a component.

More specifically, tilt is a first order optical aberration which may be described as $$\Psi_{out} = \Psi_{in} \circledast e^{\vec{\tau}\vec{r}}$$

where $\Psi_{out}$ describes the wave field after tilt, represented by $\vec{\tau}$ (tau), induced to the incoming field $\Psi_{in}$. Note that $\vec{r}=(x,y)$. Tau is a vector and therefore also denotes a direction for the tilt aberration in aberration space. The inventors have discovered that a wave equation for tilt-aberrated wave fields may be formulated as $$\frac{\partial \Psi(\vec{r}, \vec{\tau})}{\partial \vec{\tau}} = i\nabla_{\perp} \Psi(\vec{r}, \vec{\tau})$$

and by utilizing the following two equations (Eikonal equation and Continuity equation, respectively)

$$\frac{\partial \phi(\vec{r}, \vec{\tau})}{\partial \vec{\tau}} = \frac{1}{2}\nabla_{\perp} \ln[I(\vec{r}, \vec{\tau})]$$

$$\frac{\partial \ln[I(\vec{r}, \vec{\tau})]}{\partial \vec{\tau}} = -2\nabla_{\perp} \phi(\vec{r}, \vec{\tau})$$

it can be shown that the transverse phase gradient obtained from two intensities $I_1$ and $I_2$ are $$\frac{\partial \phi}{\partial \vec{r}_{1\to 2}} = \frac{1}{2|\tau_{12}|}\log\left(\frac{I_1}{I_2}\right)$$

wherein $|\tau_{12}|$ denotes the magnitude of the difference in incoherent tilt aberration between the wavefield intensity map obtained at the first incoherent tilt aberration and the second wavefield intensity map obtained at the second incoherent tilt aberration. It should again be noted that owing to logarithmic rules the log of a fraction, as shown in the above equation, is the same as the logarithm of the numerator minus the logarithm of the denominator. In other words, the above equation also includes a difference of logarithm. Note that the operator $\nabla_\perp$ in the Eikonal equation can be expressed as $$\nabla_\perp = \left(\frac{\partial}{\partial x}, \frac{\partial}{\partial y}\right).$$

In the context of the present invention, a transverse phase gradient is understood as a phase gradient which is transverse to the optical axis of the imaging system.

In the context of the present invention, a "filter having an attenuation profile with a continuous derivative" is understood as a filter arranged to attenuate electromagnetic radiation, and wherein the attenuation is described by a profile where the derivative of the attenuation profile with respect to position is continuous within a working area of the filter. The continuous derivative may be a variable continuous derivative or a constant continuous derivative. The use of such filter is a means for inducing a dependence of the aberrated wavefield of the form $e^{\tau \cdot \vec{r}}$, or other forms of dependencies including $e^{\vec{r}}e^{\tau r}e^{\tau^2}$. The filter may be a discrete physical component, or it may be inherent in another optical component of an optical system. For example, lenses naturally have an attenuation profile that could be equivalently represented by an attenuating filter capable of inducing a dependence of the aberrated waveform as mentioned above. In the case of x-ray microscopy in particular, the x-ray lenses have a Gaussian attenuation profile that allows the method of the present invention to work without any separate filter at all, since it's all inherent in the lens itself.

In the context of the present invention, a "source of electromagnetic radiation" is understood as any kind of source capable of providing electromagnetic radiation. For example, the source may be a light source, such as a light-emitting diode (LED), when the electromagnetic radiation comprises visible light.

The source of electromagnetic radiation may comprise one or more individual sources of electromagnetic radiation. For example, it may be a single source, or it may be a plurality of sources distributed in any configuration. The source of electromagnetic radiation may comprise a first source of electromagnetic radiation and a second source of electromagnetic radiation, where the two sources are two distinct entities. As an example, the source of electromagnetic radiation may be a light source implemented as LEDs on a light plate. Thereby, it becomes possible to alter the angle of incidence of light on the target by switching between lighting individual LEDs.

In the context of the present invention, an "electromagnetic radiation detector" is understood as any kind of device capable of recording/capturing a wave field intensity map. For example, the electromagnetic radiation detector may be a camera.

In an embodiment of the invention said first wave field intensity map and said second wave field intensity map are representative of intensities of light, said light comprising frequencies in the range of from 400 nanometres to 700 nanometres.

In alternative embodiments of the invention, said first and second wave field intensity maps may be representative of intensities of microwave radiation, infrared radiation, ultraviolet radiation, or X-ray radiation.

In the context of the present invention, a "difference of logarithms of wavefield intensity maps" is understood as a difference between a logarithm of an intensity (intensity value) of the first wavefield intensity map and a logarithm of an intensity (intensity value) of the second wavefield intensity map. According to an embodiment of the invention, these intensities may correspond to exact same pixels, i.e., pixel positions, in the two wavefield intensity maps. A skilled reader will readily appreciate that a difference of logarithms can also implies a logarithm of a fraction, i.e., $$\log a - \log b = \log \frac{a}{b}.$$

It should be noted that the use of logarithms, according to methods of the present invention, may also imply use of approximations of logarithms. For example, a logarithm may be approximated using e.g., a taylor expansion. Use of approximations of logarithms, and thereby approximations of differences in logarithms, may be particular for specific implementations of the method, such as computer implementations where the computational cost of carrying out elementwise logarithms on large wavefield intensity maps may be significantly reduced by use of such approximations.

By the present invention it is contemplated that the source of electromagnetic radiation used in the steps of capturing the first and second wavefield intensity map may be the same source of electromagnetic radiation, or different sources of electromagnetic radiation. For example, a first source of electromagnetic radiation may be used in capturing the first wavefield intensity map and a second source of electromagnetic radiation, different from the first source of electromagnetic radiation, may be used in capturing the second wavefield intensity map. In the case where the sources of electromagnetic radiation are the same it is understood that it is the same physical entity. In a similar manner, a first filter is used in capturing the first wavefield intensity map and a second filter is used in capturing the second wavefield intensity map. The first and second filter may be the same filter, i.e., they are the same physical entity, or they may be different filters. Likewise, an electromagnetic radiation detector is used in capturing the first wavefield intensity map, which may be denoted a first electromagnetic radiation detector, and an electromagnetic radiation detector is used in capturing the second wavefield intensity map, which may be denoted a second electromagnetic radiation detector. The first and second electromagnetic radiation detector may be the same electromagnetic radiation detector, i.e., they are the same physical entity, or they may be different electromagnetic radiation detectors. It is contemplated that any combination of sources of electromagnetic radiation, filters, and electromagnetic radiation detectors may be used according to the method of the present invention.

As a first example, a single source of electromagnetic radiation may be used in conjunction with a first filter a second filter (the two filters being two distinct filters), and a single electromagnetic radiation detector (a single entity). As a second example, a single source of electromagnetic radiation may be used in conjunction with a single filter (i.e., on physical entity being a filter), and a single electromagnetic radiation detector (a single entity). As a third example, a first source of electromagnetic radiation and a second source of electromagnetic radiation (the two sources being two distinct sources), may be used in conjunction with a first filter and a second filter (the two filters being two distinct filters), and a single electromagnetic radiation detector (a single entity). As a fourth example, a first source of electromagnetic radiation and a second source of electromagnetic radiation (the two sources being two distinct sources) may be used in conjunction with a single filter (a single entity), and a single electromagnetic radiation detector. The above four examples may additionally be varied by the source(s) of electromagnetic radiation and filter(s) being in conjunction with a first electromagnetic radiation detector and a second electromagnetic radiation detector (the two detectors being two distinct detectors), thereby totalling eight examples of implementations of source(s) of electromagnetic radiation, filter(s) and electromagnetic radiation detector(s). Thus, a skilled reader will readily appreciate that the presence (or absence) of prescripts like "first" and "second" does not as such prescribe that any specific number of a feature should be used.

According to an embodiment of the invention said difference between said first incoherent tilt aberration and said second incoherent tilt aberration is achieved by geometrically changing one or more of said source of electromagnetic radiation, said target, and said first filter and/or said second filter.

In the context of the present invention, "geometrically changing" comprises changing a position and/or an orientation. By geometrically changing one or more of said source of electromagnetic radiation, said target, and said first filter and/or said second filter is of course also understood that relative positions and/or orientations between any of these may be changed.

Achieving the difference in incoherent tilt aberration by such geometrical changes is advantageous in that the amount of tilt can be precisely determined and thus precisely accounted for in the method according to the present invention.

According to an embodiment of the invention said difference between said first tilt and said second tilt is achieved by performing a geometrical change of said source of electromagnetic radiation. This geometrical change may include a change in position and/or orientation of the source of electromagnetic radiation thereby achieving that the angle of irradiation of the target is changed. The change in position may be achieved by a transverse displacement of the source of electromagnetic radiation. For example, the source of electromagnetic radiation may be physically moved in a plane perpendicular to the optical axis. In yet another embodiment of the invention, the angle of irradiation of the target is achieved by switching from irradiating the target by a first source of electromagnetic radiation to irradiating the target by a second source of electromagnetic radiation.

According to an embodiment of the invention said difference between said first tilt and said second tilt is achieved by performing a geometrical change of said target. This geometrical change may include a change in position and/or orientation of the target. The change in position may for example be achieved by a transverse displacement of the target.

According to an embodiment of the invention said difference between said first tilt and said second tilt is achieved by performing a geometrical change of said filter having a degree of attenuation with a continuous derivative. This geometrical change may include a change in position of the filter, such as a change achieved by a transverse displacement of the filter.

According to an embodiment of the invention said geometrically changing comprises changing one or more of angle of irradiation of said target, transverse displacement of said first filter and/or said second filter, and transverse displacement of said target.

Achieving the difference in incoherent tilt aberration by such geometrical changes is advantageous in that the amount of tilt can be precisely determined and thus precisely accounted for in the method according to the present invention.

According to an embodiment of the invention, said geometrical change comprises a change in angle of irradiation of said target by said source of electromagnetic radiation. In other words, the source of electromagnetic radiation may be displaced, such as transversely displaced, to irradiate the target with electromagnetic radiation from another angle of incidence. Alternatively, a mirror may be used to steer irradiation on the target.

According to an embodiment of the invention, said geometrical change comprises a transverse displacement of said first and/or said second filter.

According to an embodiment of the invention, said geometrical change comprises a transverse displacement of said target.

By a transverse displacement may be understood a displacement which is transverse to an optical axis.

According to an embodiment of the invention said source of electromagnetic radiation used in capturing said first wavefield intensity map is a first source of electromagnetic radiation, wherein said source of electromagnetic radiation used in capturing said second wavefield intensity map is a second source of electromagnetic radiation, and wherein said second source of electromagnetic radiation is displaced with respect to said first source of electromagnetic radiation.

Thereby is achieved an advantageous way of changing between a first incoherent tilt aberration and a second incoherent tilt aberration. By having two sources of electromagnetic radiation which are displaced with respect to each other is achieved that the angle of irradiation of the target may be changed by switching from irradiating from the first source of electromagnetic radiation to irradiating from the second source of electromagnetic radiation.

If for example the electromagnetic radiation comprises light emitted from light sources, the two sources of electromagnetic radiation/light may be individual LEDs.

According to an embodiment of the invention said first filter and/or said second filter is a gaussian filter.

By a gaussian filter is understood a filter having an attenuation profile which may be described substantially by a gaussian function, i.e., a function of the form $$f(x) = a \cdot \exp\left(-\frac{(x-b)^2}{2c^2}\right)$$

where a, b, and c are constants, and x is a variable, for example a variable related to position.

Clearly, a gaussian function has a continuous derivative as the derivative of a gaussian is the gaussian function itself, which is a continuous function. Thus, an attenuation profile described by a gaussian function is naturally also an attenuation profile having a continuous derivative. The gaussian function also has a first-order component, i.e.

$$\frac{xb}{c^2},$$

and it is thus a tilt aberration.

According to an embodiment of the invention said first filter and/or said second filter is positioned in between said target and said electromagnetic radiation detector.

According to an alternative embodiment of the invention, said first filter and/or said second filter is positioned in between said source of electromagnetic radiation and said target. When referred to as in between it is understood that the filter(s) are placed in between the target and the electromagnetic radiation detector along an optical axis.

According to an alternative embodiment of the invention, said first filter and/or said second filter is positions in between said source of electromagnetic radiation and said target.

According to an embodiment of the invention said first filter and said second filter are the same filter.

By the same filter is understood that the first filter and the second filter refer to the exact same physical entity and not just two distinct filters of the same type. It should be noted that the same physical entity may refer to a discrete filter or it may refer to a filter inherent in another optical component of an optical system, such as a lens.

According to an embodiment of the invention said first filter and said second filter are different filters.

By different filters is understood that the first filter and the second filter refer to two distinct physical entities, however it does not exclude that the two filters are not similar. In fact, the filters may be identical with respect to type, optical properties, and dimensions.

According to an embodiment of the invention said step of retrieving said phase gradient involves using the following term $$\frac{\log(I_1(x_1, y_1)) - \log(I_2(x_1, y_1))}{|\tau_{12}|},$$

wherein $I_1(x_1, y_1)$ is an intensity of said first wave field intensity map at a position $(x_1, y_1)$, wherein $I_2(x_1, y_1)$ is an intensity of said second wave field intensity map at a position $(x_1, y_1)$, and wherein $|\tau_{12}|$ is said magnitude of said difference between said first tilt and said second tilt.

The above term may be used in determining the transverse phase gradient. It is noted that the term only forms part of a formula for determining the transverse phase gradient. In other words, there may be correcting factors applied to the term and therefore, the transverse phase gradient may only be proportional with the above term. However, this does not undermine the importance of the above term which is indeed a main contribution by the present invention.

As seen in the denominator of the above term, a magnitude $|\tau_{12}|$ is used. This quantity denotes the magnitude of the difference in incoherent tilt aberration between the two wavefield intensity map, i.e., magnitude of the difference between the first incoherent tilt aberration and the second incoherent tilt aberration.

As seen in the numerator of the above term, a difference of logarithms of wavefield intensity maps is provided by the term $$\log(I_1(x_1, y_1)) - \log(I_2(x_1, y_1))$$

As seen in this term a difference is taken between two logarithmic expressions; a logarithmic expression including a first intensity $I_1$ and a logarithmic expression including a second intensity $I_2$. The first intensity is an intensity of a position referenced by coordinates $x_1$ and $y_1$ in the first wavefield intensity map, and the second intensity is an intensity of a corresponding position also referenced by coordinates $x_1$ and $y_1$ in the second wavefield intensity map.

According to an embodiment of the invention said intensity $I_1$ and said intensity $I_2$ are representative of intensities of a corresponding pixel in said first wave field intensity map and said second wave field intensity maps.

The method according to the present invention involves determining the transverse phase gradient on the basis of at least a difference of logarithms of wavefield intensity maps. Specifically, it is logarithms of intensity values of the respective wavefield intensity maps that are being used. In this embodiment of the invention, the first wavefield intensity map and the second wavefield intensity map are of similar dimensions, i.e., they may be described as having the same pixel number and pixel distribution, each pixel being described with a pixel intensity value, or pixel intensity, or in short intensity. For example, the wavefield intensity maps may both comprise 512×512 pixels, 1024×1024 pixels, 1080×1920 pixels, 2048×2048 pixels, or any other number of pixels and pixel distributions. Regardless of the number of pixels and the pixel distribution, the wavefield intensity maps are similar with respect to these. For each corresponding pair of pixels $I_1$ and $I_2$ the transverse phase gradient is determined. Thereby may be obtained a phase image of the target having the same number of pixel and pixel distribution as the wavefield intensity maps.

According to an embodiment of the invention said electromagnetic radiation detector comprises a camera.

The electromagnetic radiation detector may comprise a camera which is suitable for capturing incident light and providing an image representation of the light.

According to an embodiment of the invention said electromagnetic radiation detector used for capturing said first wave field intensity map and said electromagnetic radiation detector used for capturing said second wave field intensity map are the same electromagnetic radiation detector.

According to an embodiment of the invention, the method further comprises a step of producing a transverse phase gradient map on and electronically reproducing said transverse phase gradient map, such as on an electronic display.

By a transverse phase gradient map is understood an image depicting transverse phase gradient.

According to an embodiment of the invention, said step of determining said transverse phase gradient may comprise using digital registration of said first wavefield intensity map and said second wavefield intensity map.

By digital registration is understood a computer implemented process of transforming different sets of data into one coordinate system. Specifically, in the context of the present invention, the first and second wavefield intensity may be different representations of the target due to the introduction of a change in incoherent tilt aberration. It may, depending on the circumstances leading to the two wavefield intensity maps, be necessary to perform a digital registration to ensure that the wavefield intensity maps can be properly compared, i.e., it is the correct differences in logarithms of intensity that are made. In practice, the digital registration may include shifting the wavefield intensity maps with respect to each other so that they are in alignment with respect to common features present in both wave field intensity maps. This may imply that coordinates $(x_1, y_1)$ in two different wavefield intensity maps corresponds to a common feature location on a target.

According to an embodiment of the invention, said attenuation profile of said first and second filter has a variable continuous derivative.

In the context of the present invention, a "variable continuous derivative" of an attenuation profile is understood in the way that the derivative of the attenuation profile is varying in space, not in time. The derivative of the attenuation profile, referred to in the preceding disclosure, is a derivative of the attenuation of the filter with respect to position. In the present embodiment, that derivative is variable in space, meaning that the derivative takes on different values in space/position. An example of an attenuation profile exhibiting such behaviour is an attenuation profile of the gaussian type. The derivative of a gaussian function with respect to its variable (in this case the variable is position), is also a gaussian function, and a gaussian function is a continuous function taking on different values depending on the variable. Thus, the derivative of such an attenuation profile exhibits a variable continuous behaviour.

It should be noted that the variable continuous derivative of the attenuation profile may not be the same variable continuous derivate in respect of the first and second filter as the first and second filters may be different filters according to embodiments of the present invention. Thus, the present embodiment should generally be understood in that the first and second filters have variable continuous derivatives, and the attenuation profile (and derivative) of the first and second filters may be different.

According to another embodiment of the invention, said attenuation profile of said first and second filter has a constant continuous derivative.

In the context of the present invention, a "constant continuous derivative" of an attenuation profile is understood in the way that the derivative of the attenuation profile is constant in space, not in time. The derivative of the attenuation profile, referred to in the preceding disclosure, is a derivative of the attenuation of the filter with respect to position. In the present embodiment, that derivative is constant in space, meaning that the derivative takes on the same value in space/position. An example of an attenuation profile exhibiting such behaviour is an attenuation profile of linear type, as the derivative of a linear function is a constant.

It should be noted that the constant continuous derivative of the attenuation profile may not be the same constant continuous derivate in respect of the first and second filter as the first and second filters may be different filters according to embodiments of the present invention. Thus, the present embodiment should generally be understood in that the first and second filters have constant continuous derivatives, and the attenuation profile (and derivative) of the first and second filters may be different.

Another aspect of the present invention relates to an imaging system comprising:

a source of electromagnetic radiation;
an electromagnetic radiation detector:
one or more filters having a degree of attenuation with a continuous derivative positioned between said source of electromagnetic radiation and said electromagnetic radiation detector;
a computer processor; and
a memory containing computer-implemented instructions that when carried out by said computer processor executes the steps of the method according to any of the above provisions,
wherein said imaging system is configured to be adjustable between a first degree of tilt and a second degree of tilt.

Thereby is provided an imaging system having the same advantages as mentioned in relation to the method according to the present invention. Specifically, an imaging system having at least the following advantages is provided:

First, the imaging system is versatile and usable in a number of applications and devices including high-speed quantitative phase contrast imaging of cells and other biological subjects, ptychographic microscopy, computer imaging devices such as in cell phone camera (especially for refocusing of images), augmented-reality systems (especially for range finding), and virtual reality video capture systems (especially depth of field).

Second, the imaging system operates according to an analytical method and therefore does not rely on numerical solutions. This makes the imaging system simple and fast, and thus usable in or for many applications.

Third, the imaging system does not require prior assumptions regarding the target of interest/being studied. Thereby is provided an imaging system which is potentially much faster and more robust than existing systems for e.g., light-field imaging.

In an embodiment of the invention, the imaging system may further comprise additional optical components, such as one or more optical lenses.

In an embodiment of the invention, the imaging system is implemented in a microscope for performing microscopy, such as light microscopy.

In an embodiment of the invention, the imaging system is implemented in a handheld electronic device, such as smart phone.

In an embodiment of the invention, said one or more filters has an attenuation profile having a variable continuous derivative.

In an embodiment of the invention, said one or more filters has an attenuation profile having a constant continuous derivative.

Another aspect of the present invention relates to a computer program product comprising instructions which, when the program is executed by a computer processor of an imaging system cause the computer processor to carry out the steps of the method according to any of the above provisions.

Thereby is provided a computer program product (e.g., a piece of computer software) which when executed by a computer processor achieves the same advantages as the method according to the present invention.

Another aspect of the present invention relates to a use of the method according to any of the above provisions or the imaging system according to any of the above provisions for contrast enhancement and/or digital refocusing.

According to other embodiments of the invention, the method and the imaging system according to the invention may be used for refocusing, contrast enhancement and/or 3D reconstruction.

THE DRAWINGS

Figure 6A:
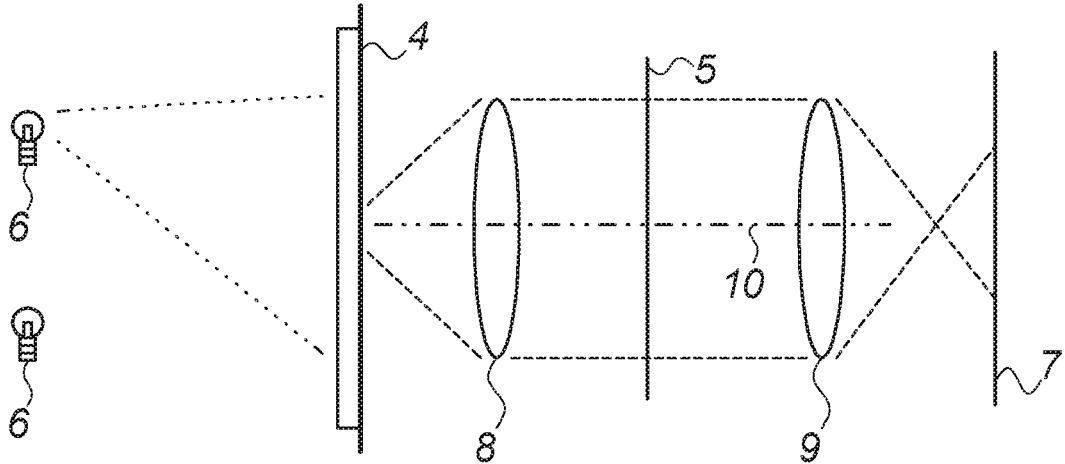
Figure 6B:
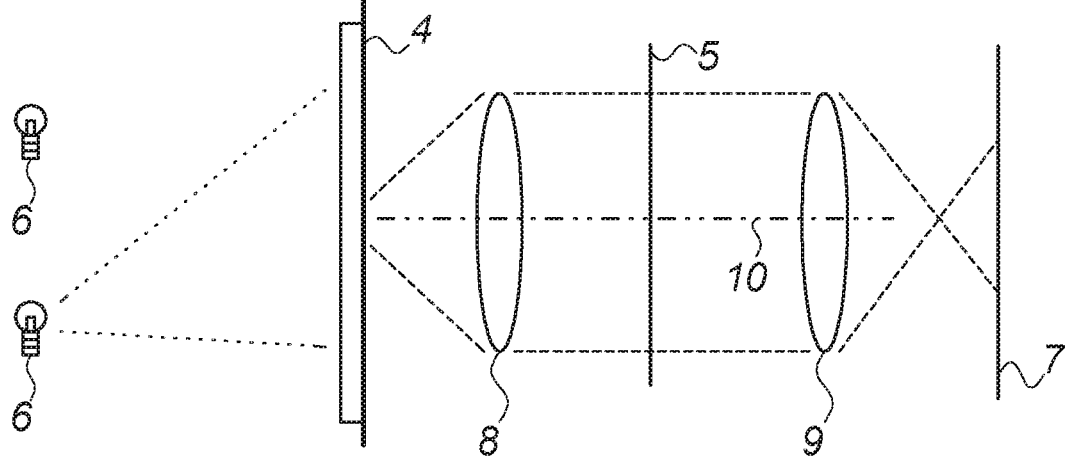
Figure 7:
Figure 7:
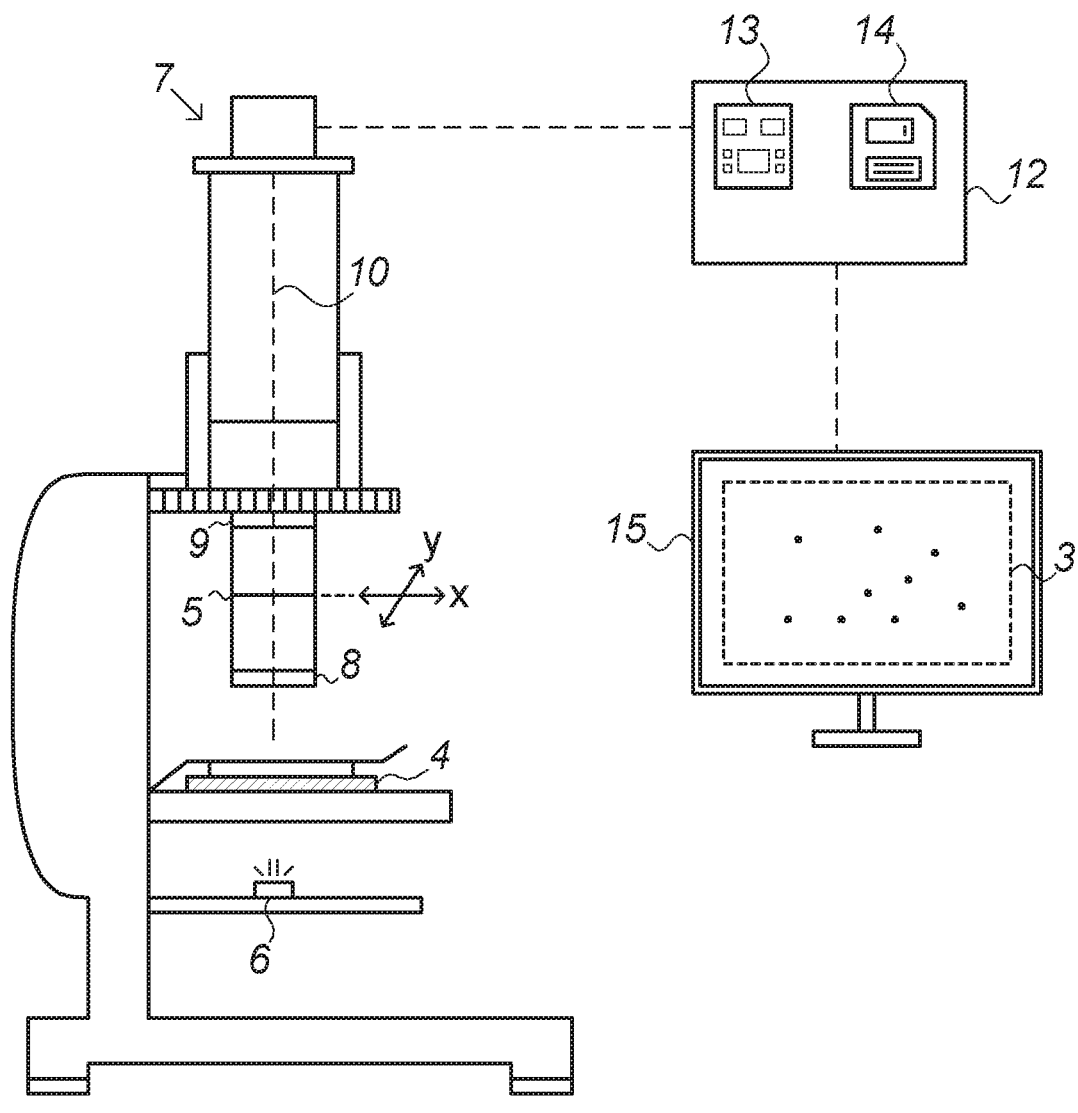
Figure 8:
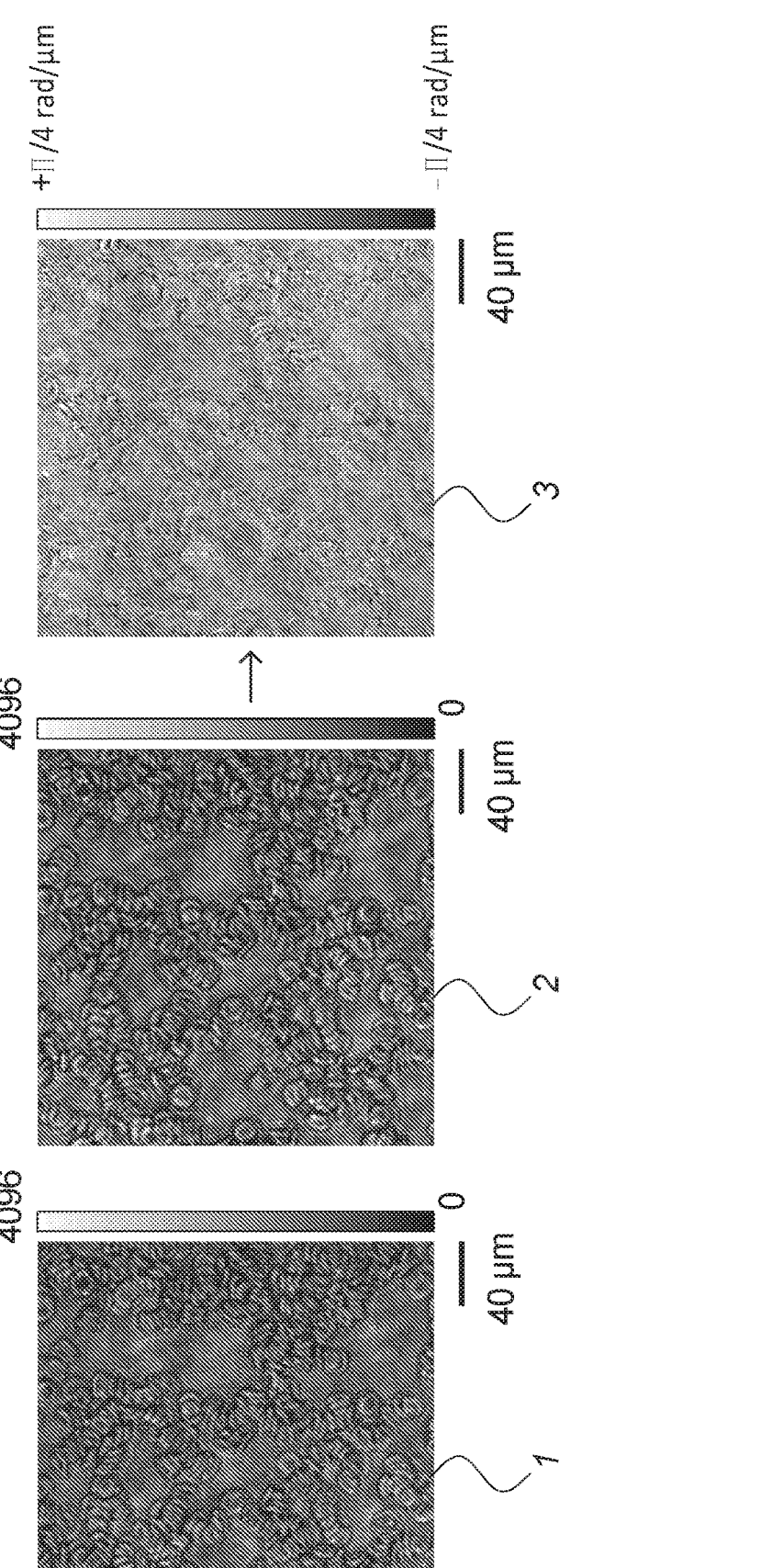

Various embodiments of the invention will in the following be described with reference to the drawings where FIG. 1 illustrates an overview of a method according to embodiments of the present invention, FIG. 2 illustrates an optical system and inducement of incoherent tilt aberration therein, according to an embodiment of the present invention, FIG. 3 illustrates an optical system and inducement of incoherent tilt aberration therein, according to another embodiment of the present invention, FIG. 4 illustrates an optical system and inducement of incoherent tilt aberration therein, according to another embodiment of the present invention, FIG. 5 illustrates an optical system and inducement of incoherent tilt aberration therein, according to another embodiment of the present invention, FIG. 6 illustrates an optical system and inducement of incoherent tilt aberration therein, according to another embodiment of the present invention, FIG. 7 illustrates an imaging system according to an embodiment of the present invention, and FIG. 8 illustrates a transverse phase gradient map obtained in accordance with a method of the present invention.

DETAILED DESCRIPTION

FIG. 1 illustrates an overview of a method according to embodiments of the present invention. The method comprises three steps S1-S3.

The first step S1 comprises capturing at a first incoherent tilt aberration a first wave field intensity map 1 of a target 4 at a first degree of incoherent tilt aberration, using a filter 5 having an attenuation profile with a continuous derivative positioned between a source of electromagnetic radiation 6 and an electromagnetic radiation detector 7 capturing the first wave field intensity map 1.

The second step S2 comprises capturing at a second incoherent tilt aberration a second wave field intensity map 2 of a target 4 at a second degree of incoherent tilt aberration, using a filter 5 having an attenuation profile with a continuous derivative positioned between a source of electromagnetic radiation 6 and an electromagnetic radiation detector 7 capturing the second wave field intensity map 2.

The third step S3 comprises using the captured first wave field intensity map 1 and the captured second wave field intensity map 2 to determine a transverse phase gradient. The two captured wavefield intensity maps are compared point by point (or pixel by pixel) and the intensities at corresponding points/pixels on the two wave field intensity maps are specifically used to obtain a transverse phase gradient at that point/pixel. The transverse phase gradient is determined by taking a difference of logarithms of the intensities and dividing by a magnitude of a difference between the first incoherent tilt aberration and the second incoherent tilt aberration. Thereby a transverse phase gradient map 3 may be obtained on the basis of the two wavefield intensity maps.

It is noted that FIG. 1 only serves to conceptually illustrate the underlying workings of a method according to embodiments of the present invention, and the presentation of the features on the figure is only illustrative of the functionality of the features and thus non-limiting to the scope of protection as defined in the claims. For example, although illustrated as a light bulb, the source of electromagnetic radiation 6 is not limited to a light bulb, and other sources of electromagnetic radiation may also be contemplated by this term. The target 4 is conceptually illustrated (as an abstraction of a target), and any kind of target may indeed be contemplated by this term.

Figure 2A:
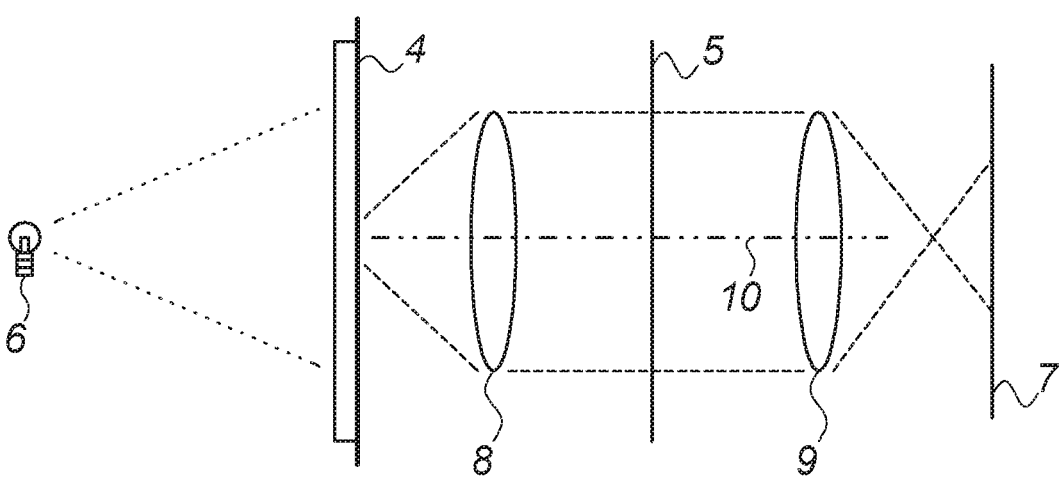
Figure 2B:
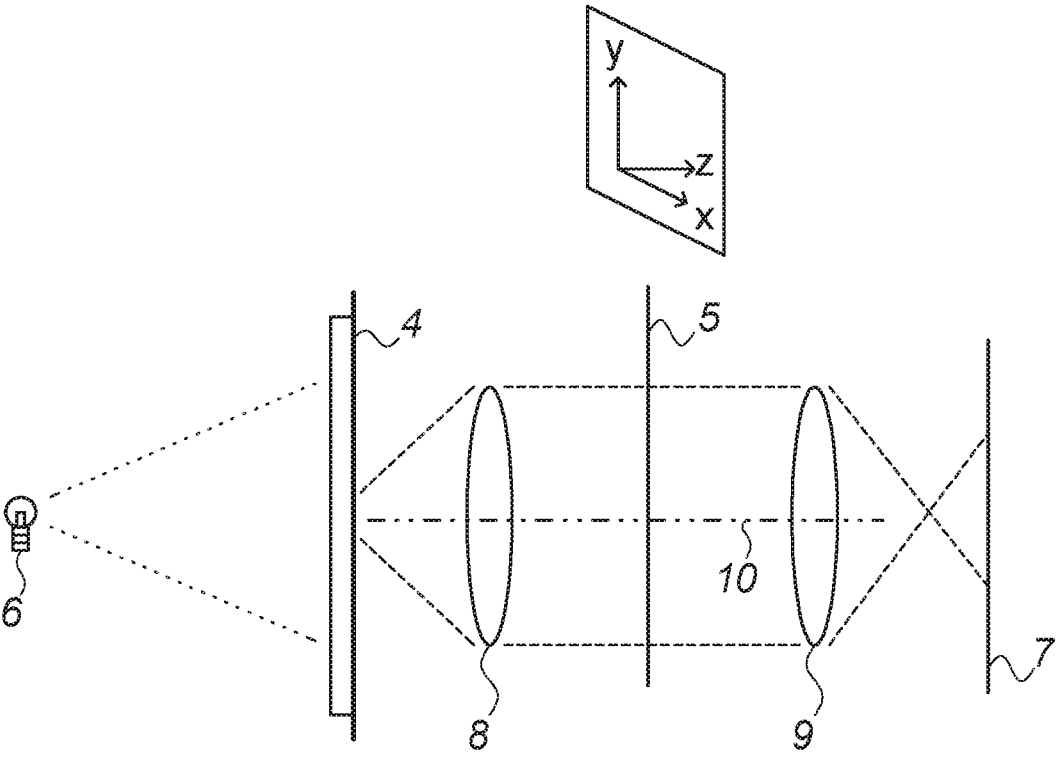

FIGS. 2*a-b* illustrates two instances of an optical system according to an embodiment of the invention that is suitable for carrying out the method according to embodiments of the present invention.

In FIG. 2*a* is shown a source of electromagnetic radiation 6 which is a source of light. However, in other embodiments of the invention, the source of electromagnetic radiation 6 may be other sources of electromagnetic radiation than a light source. The light source 6 illuminates a target 4 which in the present embodiment is a sample to be investigated. Examples of such samples may be biological samples which tend to be nearly transparent, making them difficult to image using conventional microscopes. Light scattered off the target 4 is collected by an objective lens 8 and passes through a filter 5. The filter 5 is characterized by having an attenuation profile where the derivative of the attenuation profile with respect to position is continuous within a working area of the filter. In this example the filter 5 is a gaussian filter, however, in other embodiments of the invention, the filter may be described by any other attenuation profile also characterized by having a continuous derivative with respect to position within the working area of the filter. The light exiting the filter 5 is collected in a tube lens 9 and directed towards an electromagnetic radiation detector 7. The electromagnetic radiation detector 7 in this embodiment comprises a CCD (Charged Coupled Device) and is able to image the light striking the detector. Thereby, the electromagnetic radiation detector 7 is capable of capturing a wavefield intensity map.

To better illustrate the method according to the present invention, the electromagnetic radiation detector 7 captures the first wavefield intensity map 1 in the system setup shown in FIG. 2*a*.

In FIG. 2*b* is shown the same optical system as in FIG. 2*a*, however the filter 5 has been displaced transversely (in the x-y plane defined by the arrows in FIG. 2*b*) with respect to the optical axis 10. In this specific example, shown in FIG. 2*b*, the filter 5 has been transversely displaced in the y-direction with respect to the optical axis (z-direction, see also FIG. 2*b*). The effect of the transverse displacement of the filter 5 is that a change in incoherent tilt aberration is induced, from a first incoherent tilt aberration at the instance shown in FIG. 2*a* to second incoherent tilt aberration at the instance shown in FIG. 2*b*. The electromagnetic radiation detector 7 may then capture the second wavefield intensity map 2 using the configuration of the filter 5 as shown in FIG. 2*b*.

Thereby is captured two different wave field intensity maps (1 and 2), each associated with a specific incoherent tilt aberration and thus a specific incoherent tilt aberration. By utilizing the step S3 shown in FIG. 1, it is possible to determine transverse phase gradient(s) using the wavefield intensity maps captured in the instances shown in FIG. 2*a-b*.

Although FIG. 2*b* illustrates a transverse displacement in the y-direction, it is noted that any transverse displacement in the transverse plane (x-y) may be used to induce a change in incoherent tilt aberration.

Figure 3A:
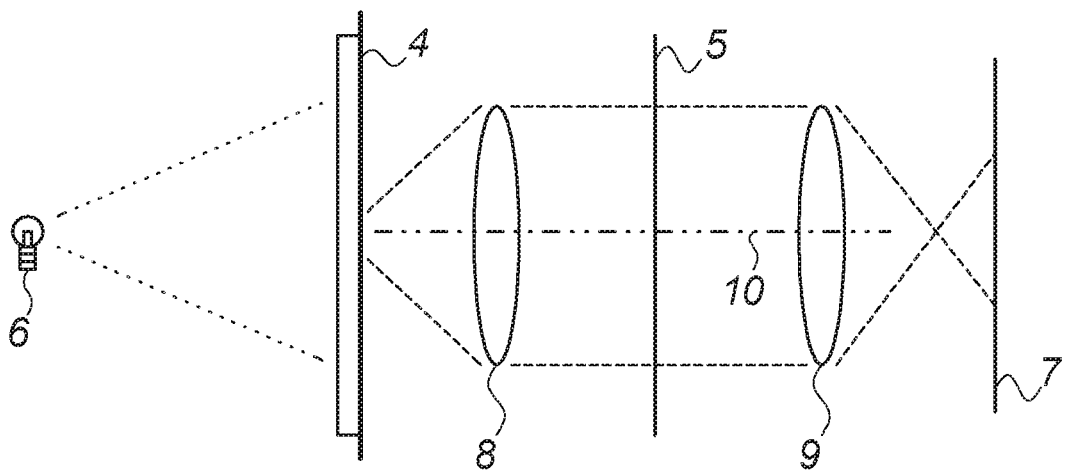
Figure 3B:
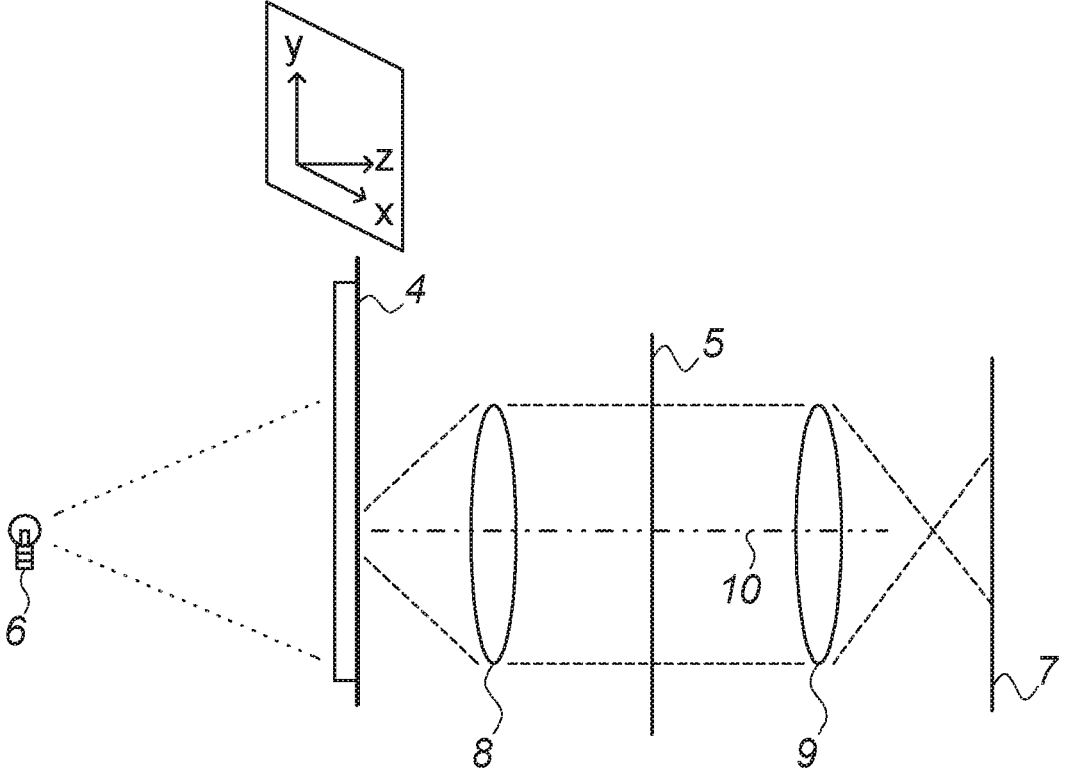

FIGS. 3*a-b* illustrate two instances of an optical system according to another embodiment of the invention that is suitable for carrying out the method according to embodiments of the present invention.

In FIG. 3*a* is shown an optical system similar to the system shown in FIG. 2*a*. The electromagnetic radiation detector 7 is equally able to capture a first wavefield intensity map 1.

In FIG. 3*b* is shown the same optical system as in FIG. 3*a*, however, the target 4 has been displaced transversely (in the x-y plane defined by the arrows in FIG. 3*b*) with respect to the optical axis 10. In this specific example, shown in FIG. 3*b*, the target 4 has been transversely displaced in the y-direction with respect to the optical axis (z-direction, see also FIG. 3*b*). The effect of the transverse displacement of the target 4 is that a change in incoherent tilt aberration is induced, from a first incoherent tilt aberration at the instance shown in FIG. 3*a* to second incoherent tilt aberration at the instance shown in FIG. 3*b*. The electromagnetic radiation detector 7 may then capture the second wavefield intensity map 2 using the configuration of the target 4 as shown in FIG. 3*b*.

Thereby is captured two different wave field intensity maps (1 and 2), each associated with a specific incoherent tilt aberration and thus a specific incoherent tilt aberration. By utilizing the step S3 shown in FIG. 1, it is possible to determine transverse phase gradient(s) using the wavefield intensity maps captured in the instances shown in FIG. 3*a-b*. The step S3 may be implemented as a digital registration step.

Although FIGS. 3*a-b* show that a change in incoherent tilt aberration may be induced by transverse displacement of the target 4, it must be noted that the change in incoherent tilt aberration may also be induced by rotation of the target 4 in the x-y plane, i.e., by rotation in a plane which is transverse, orthogonal to the optical axis (or z-axis).

Figure 4A:
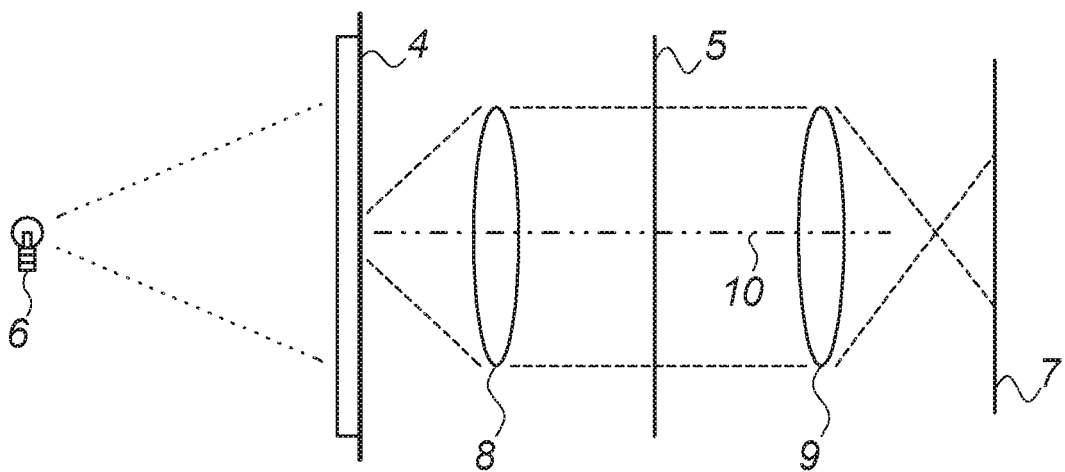
Figure 4B:
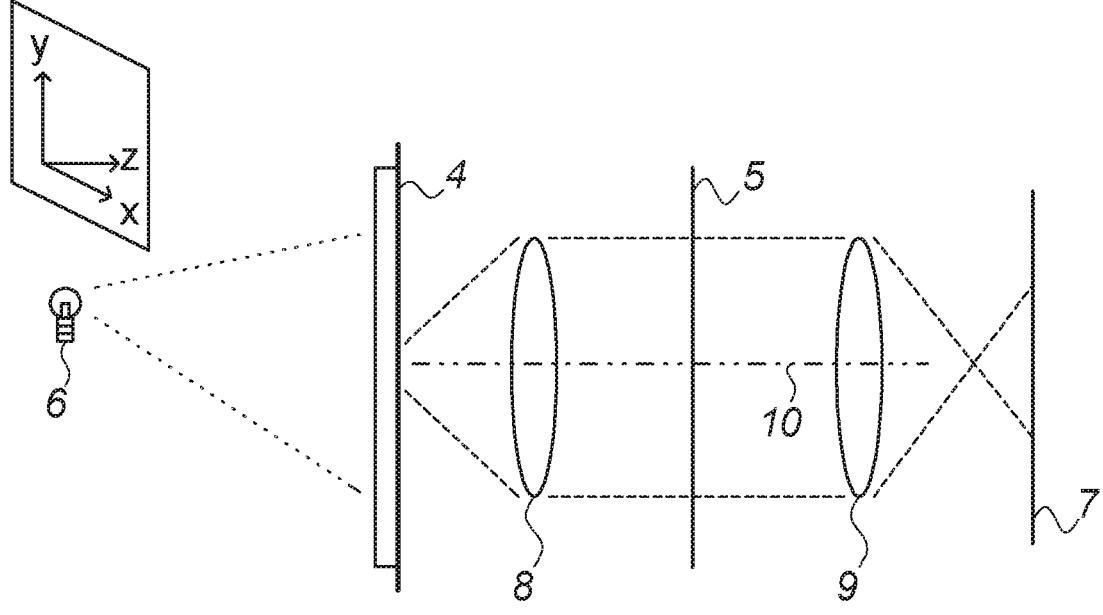

FIGS. 4*a-b* illustrate two instances of an optical system according to yet another embodiment of the invention that is suitable for carrying out the method according to embodiments of the present invention.

In FIG. 4*a* is shown an optical system similar to the system shown in FIGS. 2*a* and 3*a*. The electromagnetic radiation detector 7 is equally able to capture a first wavefield intensity map 1.

In FIG. 4*b* is shown the same optical system as in FIG. 4*a*, however, the source of electromagnetic radiation 6 has been displaced transversely (in the x-y plane defined by the arrows in FIG. 4*b*) with respect to the optical axis 10. In this specific example, shown in FIG. 4*b*, the source of electromagnetic radiation 6 has been transversely displaced in the y-direction with respect to the optical axis (z-direction, see also FIG. 4*b*). The effect of the transverse displacement of the source of electromagnetic radiation 6 is that a change in incoherent tilt aberration is induced, from a first incoherent tilt aberration at the instance shown in FIG. 4*a* to second incoherent tilt aberration at the instance shown in FIG. 4*b*. The electromagnetic radiation detector 7 may then capture the second wavefield intensity map 2 using the configuration of the source of electromagnetic radiation as shown in FIG. 4*b*.

Thereby is captured two different wave field intensity maps (1 and 2), each associated with a specific incoherent tilt aberration and thus a specific incoherent tilt aberration. By utilizing the step S3 shown in FIG. 1, it is possible to determine transverse phase gradient(s) using the wavefield intensity maps captured in the instances shown in FIG. 4*a-b*.

Although FIGS. 4*a-b* show that a change in incoherent tilt aberration may be induced by transverse displacement of the source of electromagnetic radiation 6, it must be noted that the change in incoherent tilt aberration may also be induced by changing an angle of illumination of the target 4.

Figure 5A:
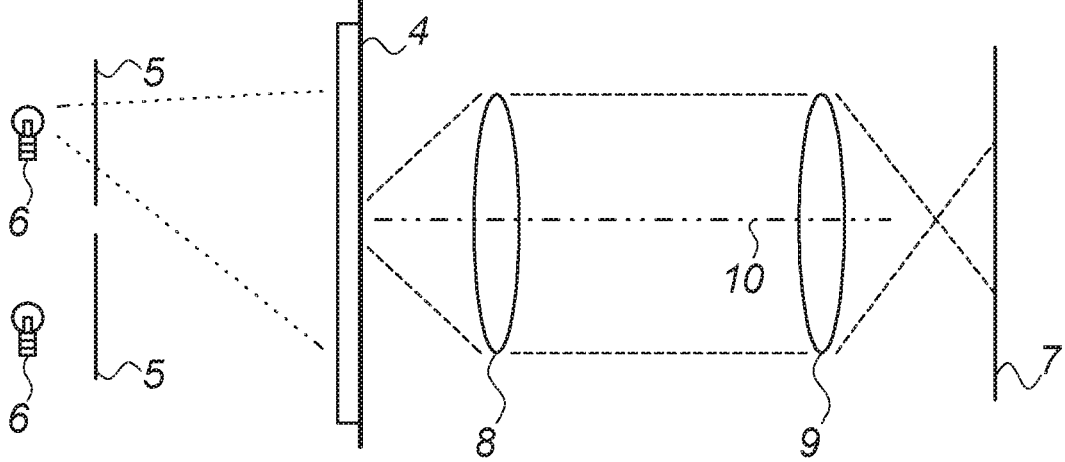
Figure 5B:
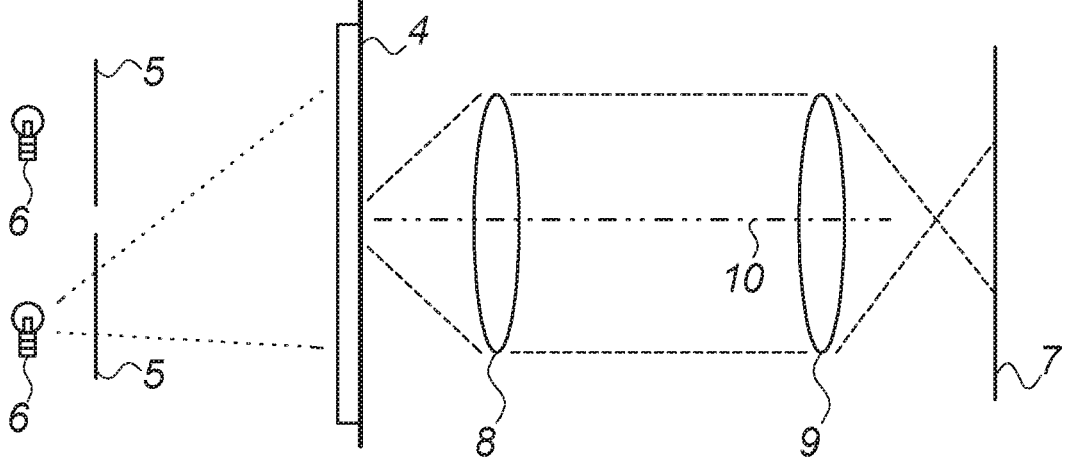

FIG. 5*a-b* illustrate two instances of an optical system according to yet another embodiment of the invention that is suitable for carrying out the method according to embodiments of the present invention.

In FIG. 5*a* is shown two sources of electromagnetic radiation 6: a first source of electromagnetic radiation 5 (upper source 6 in FIG. 5*a*), and a second source of electromagnetic radiation 6 (lower source 6 in FIG. 5*a*). Furthermore, the figure shows two filters 5: a first filter 5 (upper filter in FIG. 5*a*), and a second filter 5 (lower filter in FIG. 5*a*). Each of the first and second filters 5 is characterized by having an attenuation profile having a continuous derivative with respect to position, similar to the filters shown in FIGS. 2*a-4b*. As seen in the figure, the first and second filter 5 are placed in between the target 4 and the first and second source of electromagnetic radiation 6 respectively. The remaining parts of the setup show in FIG. 5*a* on the right-hand side of the target 4 are like the setups shown in FIG. 2*a*, FIG. 3*a*, and FIG. 4*a*.

The electromagnetic radiation detector 7 is able to capture a first wavefield intensity map 1 in the configuration shown in FIG. 5*a*.

In FIG. 5*b* is shown the same optical setup as in FIG. 5*a*, however, now the electromagnetic radiation is provided by the second source of electromagnetic radiation 6 rather than the first source of electromagnetic radiation 6, and the electromagnetic radiation irradiates the target 4 through the second filter 5. The electromagnetic radiation detector 7 may then capture the second wavefield intensity map 2 using the configuration as shown in FIG. 5*b*.

Thereby is captured two different wave field intensity maps (1 and 2), each associated with a specific incoherent tilt aberration and thus a specific incoherent tilt aberration. By utilizing the step S3 shown in FIG. 1, it is possible to determine transverse phase gradient(s) using the wavefield intensity maps captured in the instances shown in FIG. 5*a-b*.

This embodiment clearly shows a possible route to changing the angle of the electromagnetic radiation incident on the target 4, and thereby also the incoherent tilt aberration, namely by switching from a first source of electromagnetic radiation 6 to a second (and relatively displaced) source of electromagnetic radiation 6. If the electromagnetic radiation is light, the sources 6 could be individual light sources of an LED board.

FIGS. 6*a-b* illustrate two instances of an optical system according to yet another embodiment of the invention that is suitable for carrying out the method according to embodiments of the present invention. The embodiment is similar to the embodiment shown in FIGS. 5*a-b*, however instead of two filters 5 arranged between the sources of electromagnetic radiation 6 and the target 4, a single filter 5 is arranged in between the objective lens 8 and the tube lens 9. Different incoherent tilt aberrations may still be achieved in the wavefield intensity maps by changing between irradiating the target 4 by the first source of electromagnetic radiation 6 and irradiating the target 4 by the second source of electromagnetic radiation 6.

FIG. 7 illustrates an imaging system 11 according to an embodiment of the present invention. In this embodiment of the invention, the optical system of the imaging system 11 is illustrated as a light microscope, however, according to other embodiments of the invention the imaging system 11 may take on other forms, such as handheld electronic devices such as a smartphone.

As seen in the figure there is one source of electromagnetic radiation 6, which in this embodiment takes on the form of an LED, and the LED is positioned such that it illuminates a target 4, received in the light microscope, from underneath. The target 4 may for example comprise a biological sample, such as cells, which may be difficult to observe using conventional light microscopy. Above the target 4 are the optics of the microscope which includes an objective lens 8, a tube lens 9, and a filter 5. The filter 5 is characterized by having an attenuation profile with a continuous derivative with respect to position. The filter 5 is configured to be translated in a plane (indicated by x- and -y directions in figure) perpendicular to the optical axis 10 to facilitate changes of incoherent tilt aberration. The filter 5, which may be a gaussian filter, is positioned in the infinity plane, i.e., between the objective lens 8 and the tube lens 9.

As seen, the optical components: objective lens 8, tube lens 9, and filter 5 are arranged along the common optical axis 10. At the top of the light microscope is an electromagnetic radiation detector 7 configured to detect light scattered by the target 4 and collected through the optics of the light microscope.

Comparing FIG. 7 to FIG. 6, it is evident that the embodiment of FIG. 7 may be regarded as a specific implementation of the embodiment of FIG. 2, and therefore the imaging system 11 of FIG. 7 is also capable of carrying out the steps S1-S3 of the method explained in relation to FIG. 1.

The electromagnetic radiation detector 7 is communicatively associated with a computer processing arrangement 12, such as a personal computer. The computer processing arrangement 12 comprises a memory 14 which may store a computer program product comprising computer readable instructions that when executed by the computer processor 13 of the computer processing arrangement 12 causes the imaging system 11 to carry out the steps S1-S3 of the method explained in relation to FIG. 1. The computer program product is loaded into the memory 14, however according to an alternative embodiment of the invention, the computer program product may already be pre-stored on a memory 14 which is insertable to the computer processing arrangement 12.

The computer processing arrangement 12 is furthermore communicatively associated with a screen 15 for displaying a transverse phase gradient map 3, e.g., a phase image. In this embodiment the display 15 is illustrated as a desktop screen, however this is not illustrative of the only possible type of display 15, and other types of displays are indeed conceivable according to other embodiments of the invention. For example, the display 15 may be a display of a smartphone (not shown in the figures).

Although the computer processor 13 is shown together with a light microscope and a display (in the form of a desktop screen) this is not illustrative of the only possible configuration of the imaging system 11, and other implementations of the imaging system 11 are indeed conceivable according to other embodiments of the invention. For example, the imaging system 11 may form part of a smartphone (not shown in the figures).

FIG. 8 illustrates actual results obtained by a method according to the present invention using a microscope. Two wave-field intensity maps have been captured; a first wave field intensity map 1 and a second wave field intensity map 2. The wavefield intensity maps are each accompanied by an intensity from 0 to 4096. A scale bar of length 40 micrometers is shown next to the wavefield intensity maps. Each of the wave field intensity maps, or images, depicts the same clusters of human red blood cells under a 20× magnification. The first and second wave field intensity maps are obtained with opposing incoherent tilt aberrations corresponding to a +/−1.5 mm shift of a Gaussian filter placed in the infinity plane of the microscope (i.e., between the objective lens and relay/tube lens 9 (not shown on figure).

FIG. 8 also illustrates a transverse phase gradient map 3 which has been obtained on the basis of the first wave field intensity map 1 and the second wave field intensity map 2 using the method according to the present invention. Alongside the transverse phase gradient map 3 (or transverse phase gradient image) is shown a scalebar indicating the value of the transverse phase gradient, in units of radians/micrometer, ranging from −pi/4 to pi/4. The transverse phase gradient map shows as clear phase gradient contrast from the particles. This can either be used as-is as an additional contrast mechanism, or numerically integrated to determine a phase image, and therefore the complex wavefield (allowing e.g., refocusing).

LIST OF REFERENCE SIGNS

1 First wave field intensity map
2 Second wave field intensity map
3 Transverse phase gradient map
4 Target
5 Filter
6 Source of electromagnetic radiation
7 Electromagnetic radiation detector
8 Objective lens
9 Tube lens
10 Optical axis
11 Imaging system
12 Computer processing arrangement
13 Computer processor
14 Memory
15 Display
S1-S3 Method steps

The invention claimed is:

1. A method for obtaining a transverse phase gradient of a wave field from at least a first wavefield intensity map and a second wave field intensity map, said method comprising the steps of:

capturing at a first incoherent tilt aberration said first wave field intensity map of a target, using a first filter having an attenuation profile with a continuous derivative positioned between a source of electromagnetic radiation and an electromagnetic radiation detector capturing said first wave field intensity map, capturing at a second incoherent tilt aberration said second wave field intensity map of said target, using a second filter having an attenuation profile with a continuous derivative positioned between a source of electromagnetic radiation and an electromagnetic radiation detector capturing said second wave field intensity map, wherein said second incoherent tilt aberration is different from said first incoherent tilt aberration, determining said transverse phase gradient on the basis of at least a difference of logarithms of wavefield intensity maps divided by the magnitude of the difference between said first incoherent tilt aberration and said second incoherent tilt aberration, wherein said difference of logarithms of wavefield intensity maps is a difference between a logarithm of an intensity of said first wave field intensity map and a logarithm of an intensity of said second wave field intensity map.

2. The method according to claim 1, wherein said difference between said first incoherent tilt aberration and said second incoherent tilt aberration is achieved by geometrically changing one or more of said source of electromagnetic radiation, said target, and said first filter and/or said second filter.

3. The method according to claim 2, wherein said geometrically changing comprises changing one or more of angle of irradiation of said target, transverse displacement of said first filter and/or said second filter, and transverse displacement of said target.

4. The method according to claim 1, wherein said source of electromagnetic radiation used in capturing said first wavefield intensity map is a first source of electromagnetic radiation, wherein said source of electromagnetic radiation used in capturing said second wavefield intensity map is a second source of electromagnetic radiation, and wherein said second source of electromagnetic radiation is displaced with respect to said first source of electromagnetic radiation.

5. The method according to claim 1, wherein said first filter and/or said second filter is a gaussian filter.

6. The method according to claim 1, wherein said first filter and/or said second filter is positioned in between said target and said electromagnetic radiation detector.

7. The method according to claim 1, wherein said first filter and said second filter are the same filter.

8. The method according to claim 1, wherein said first filter and said second filter are different filters.

9. The method according to claim 1, wherein said step of retrieving said phase gradient involves using the following term $$\frac{\log(I_1(x_1, y_1)) - \log(I_2(x_1, y_1))}{|\tau_{12}|},$$

wherein $I_1(x_1, y_1)$ is an intensity of said first wave field intensity map at a position $(x_1, y_1)$, wherein $I_2(x_1, y_1)$ is an intensity of said second wave field intensity map at a position $(x_1, y_1)$, and wherein $|\tau_{12}|$ is said magnitude of said difference between said first tilt and said second tilt.

10. The method according to claim 9, wherein said intensity $I_1$ and said intensity $I_2$ are representative of intensities of a corresponding pixel in said first wave field intensity map and said second wave field intensity maps.

11. The method according to claim 1, wherein said electromagnetic radiation detector comprises a camera.

12. The method according to claim 1, wherein said electromagnetic radiation detector used for capturing said first wave field intensity map and said electromagnetic radiation detector used for capturing said second wave field intensity map are the same electromagnetic radiation detector.

13. The method according to claim 1, wherein said attenuation profile of said first and second filter has a variable continuous derivative.

14. The method according to claim 1, wherein said attenuation profile of said first and second filter has a constant continuous derivative.

15. The method according to claim 1, wherein the method is executed by a computer processor of an imaging system.

16. Use of the method according to claim 1 for contrast enhancement and/or digital refocusing.

17. An imaging system comprising:

a source of electromagnetic radiation;

an electromagnetic radiation detector;

a first and a second filters;

a computer processor; and a memory containing computer-implemented instructions that when carried out by said computer processor executes the steps;

capturing at a first incoherent tilt aberration a first wave field intensity map of a target, using said first filter having an attenuation profile with a continuous derivative positioned between said source of electromagnetic radiation and said electromagnetic radiation detector capturing said first wave field intensity map, capturing at a second incoherent tilt aberration a second wave field intensity map of said target, using said second filter having an attenuation profile with a continuous derivative positioned between a source of electromagnetic radiation and an electromagnetic radiation detector capturing said second wave field intensity map, wherein said second incoherent tilt aberration is different from said first incoherent tilt aberration, determining said transverse phase gradient on the basis of at least a difference of logarithms of wavefield intensity maps divided by the magnitude of the difference between said first incoherent tilt aberration and said second incoherent tilt aberration, wherein said difference of logarithms of wavefield intensity maps is a difference between a logarithm of an intensity of said first wave field intensity map and a logarithm of an intensity of said second wave field intensity map wherein said imaging system is configured to be adjustable between a first degree of tilt and a second degree of tilt.

18. Use of the imaging system according to claim 17 for contrast enhancement and/or digital refocusing.

19. The imaging system according to claim 17, wherein said first and second filters have an attenuation profile having a variable continuous derivative.

20. The imaging system according to claim 17, wherein said first and second filters have an attenuation profile having a constant continuous derivative.

* * * * *